US006842755B2

(12) United States Patent
Maslov

(10) Patent No.: US 6,842,755 B2
(45) Date of Patent: Jan. 11, 2005

(54) SYSTEM AND METHOD FOR AUTOMATIC RETRIEVAL OF STRUCTURED ONLINE DOCUMENTS

(75) Inventor: Vadim Maslov, Herndon, VA (US)

(73) Assignee: divine technology ventures, Chicago, IL (US)

( * ) Notice: Subject to any disclaimer, the term of this patent is extended or adjusted under 35 U.S.C. 154(b) by 135 days.

(21) Appl. No.: 09/962,375

(22) Filed: Sep. 25, 2001

(65) Prior Publication Data
US 2002/0049882 A1 Apr. 25, 2002

Related U.S. Application Data

(60) Provisional application No. 60/235,058, filed on Sep. 25, 2000.

(51) Int. Cl.[7] .......................... G06F 17/30; G06F 15/16; G09G 5/00
(52) U.S. Cl. ............................. 707/10; 707/2; 709/219; 345/704
(58) Field of Search ......................... 707/2, 3, 10, 102; 345/704; 709/203, 219, 200

(56) References Cited

U.S. PATENT DOCUMENTS

| 5,793,972 A | * | 8/1998 | Shane ........................ 709/219 |
| 5,983,262 A | * | 11/1999 | Kukkal ....................... 709/204 |
| 6,012,088 A | | 1/2000 | Li et al. |
| 6,026,441 A | | 2/2000 | Ronen |
| 6,092,074 A | * | 7/2000 | Rodkin et al. .............. 707/102 |
| 6,098,065 A | | 8/2000 | Skillen et al. |
| 6,189,024 B1 | * | 2/2001 | Bauersfeld et al. ......... 709/203 |
| 6,230,185 B1 | * | 5/2001 | Salas et al. ................. 709/205 |
| 6,538,673 B1 | * | 3/2003 | Maslov ....................... 345/853 |
| 6,738,804 B1 | * | 5/2004 | Lo ............................. 709/219 |
| 2002/0054090 A1 | * | 5/2002 | Silva et al. ................. 345/747 |

OTHER PUBLICATIONS

Noirhomme–Fraiture et al, "Visual representation of hypermedia links according to their types", Proceedings of the working conference on Advanced visual interfaces, May 1998, pp. 146–155.*

* cited by examiner

*Primary Examiner*—Uyen Le
(74) *Attorney, Agent, or Firm*—Bell, Boyd & Lloyd LLC

(57) ABSTRACT

A method and system for automatic retrieval of a document linking to a starting document that has a static address on a data network. A sequence of commands that cause a browser in a computer system to navigate from a starting document to a target document on a data network is recorded. The recorded sequence of commands can be reproduced to cause the browser to navigate from the starting document through a sequence of intermediate documents to the refreshed version of the target document. More particularly, the invention allows retrieval of the target document even when the intermediate and the target documents are dynamically generated by a server computer and thus their online addresses change every time they are loaded.

12 Claims, 4 Drawing Sheets

```
HTML Tree
□·<HTML>      420
  ⊞·<HEAD>
  □·<BODY>
     ·<I>
     ·<META>
     ·<META>
     □·<FORM>
        □·<CENTER>
           □·<P>
              ⊞·<TABLE>
              ⊞·<TABLE>
              □·<TABLE>
                 □·<TBODY>
                    □·<TR>
                       ⊞·<TD>
                       □·<TD>
                          □·<TABLE>
                             □·<TBODY>
                                ⊞·<TR>
                                ⊞·<TR>
                                ⊞·<TR>
                                ⊞·<TR>
                                ⊞·<TR>
                                ⊞·<TR>
                                ⊞·<TR>
                                ⊞·<TR>
                                □·<TR>
                                   ·<TD>
                                   ·<TD>
                                   □·<TD>
                                      <INPUT>   430
                                      <INPUT>
                          ·<IMG>
                       ⊞·<TD>
                    ⊞·<TR>
                    ⊞·<TR>
                    ⊞·<TR>
```

Fig. 4

SYSTEM AND METHOD FOR AUTOMATIC RETRIEVAL OF STRUCTURED ONLINE DOCUMENTS

RELATED APPLICATION

The present application claims the benefit from U.S. Provisional Patent Application Ser. No. 60/235,058 filed Sep. 25, 2000, entitled "SYSTEM AND METHOD FOR RECORDING STRUCTURED ONLINE DOCUMENT NAVIGATION AND FORM SUBMISSION COMMANDS AND AUTOMATIC REPLAYING OF THE RECORDED COMMANDS FOR DYNAMICALLY GENERATED ONLINE DOCUMENTS," the entire disclosure of which is incorporated herein by reference.

FIELD OF THE INVENTION

The present invention relates to automatic retrieval of a document linking to a starting document that has a static address on a data network, and more particularly, to recording a sequence of commands that causes a browser in a computer system to navigate from a starting document to a target document on a data network.

BACKGROUND OF THE INVENTION

Terminology

Terminology related to the invention is explained in the following.

Navigation Command

Basic instructions that perform navigation from one document (web page) to another, or prepare data for such navigation. The command may be one of: (i) hyperlinks embedded in the page; (ii) form fields contained in online forms; (iii) submission of basic authentication credentials; (iv) clicks of HTML element to cause invocation of client-side JavaScript embedded in the web page.

Script.

A recorded or otherwise created sequence of navigation commands.

Starting Document.

The first document (web page) in a sequence of documents (web pages) visited under the control of a script. The starting document is identified by a static web address, such as URL. For password-protected session-based documents, this is usually the page where user ID and password is entered.

Target Document.

The last document (web page) in a sequence of documents (web pages) visited under the control of a script. If a script has more than one command in it, then the target document is dynamically generated and will have a dynamic address.

Control Element.

Control elements represent a command or a group of commands. Control element of a online document may be clicked to cause navigation from one online document to another online document, or from one control element to another. Control elements can be one of: (i) hyperlinks, (ii) form Submit button, (iii) clickable HTML element that cause navigation JavaScript to run, (iv) etc.

Logical Tree (Document Tree).

The data structure that describes the structure of an online document or relationships between control elements. A logical tree consists of nodes and nodes are connected by edges. If there is an edge leading from node a to node b, it means that node b represents the part of online document that is a subset of the part of the document represented by node a such that b covers the biggest element that still is a subset of a. One node that has no edge directed to it is called a root node of the tree. A logical tree can be obtained for each control element in an online document, such as hyperlinks, form submit button, clickable HTML element that cause navigation JavaScript to run, etc., describing the relationship between the control element and other control elements and online documents.

Document Object Model (DOM).

A standardized way of representing online document as a tree. In DOM, every HTML tag is represented by a tree node and the top-level HTML tag is represented by the document tree root. More details are provided below.

Structured online documents, such as HTML and XML documents are widely available on the World Wide Web (WWW). While some web pages are linked using static online addresses, such as URL (Universal Resource Locator), some pages are linked to a starting page using dynamic addresses. These pages are dynamically generated by a server computer and as such, every page received by a browser has a unique address and a unique set of links in it. Such documents usually contain data that may be periodically updated, wherein such update does not substantially change the format of presentation of such data.

These documents are usually dynamically generated by web servers. Data contained in the documents may be introduced from certain data sources, such as online databases. The documents may contain dynamic data, whose content changes from time to time. However, since these documents are automatically generated by computers, the document structure remains substantially the same for a relatively long period.

Oftentimes, documents that contains dynamic data or are security-sensitive are not identified by a static (does not change with time) online address, such as Universal Resource Locator or URL. Instead, a computer user must start from a starting document that has static address and go through several intermediate documents linking to the starting document before the user can finally retrieve the target document from the server. On some of these intermediate documents, the user must enter authentication data, such as a user ID and password. On some other intermediate documents, users must make choices presented to him as a variety of links or as an online form that collects data needed to continue navigation.

In many cases, servers deliberately generate web pages with globally unique addresses and links in these pages in order to increase the security of online transactions and make the regenerate attacks hard or impossible. As a result, every time users want to access the target document, they must navigate through a series of documents and enter numerous commands before they can access the target document.

Examples of online documents as described above include (1) shipment tracking information provided by couriers: users typically have to start from the starting document that contains a tracking request form, fill out the tracking request form, submit required information, and further link to several pages before reaching the page containing tracking results. (2) Bank account balance for an individual or corporation from its bank web site: users typically are asked to enter User ID and Password on the starting page, and then brought to the Welcome page. The users are then requested to make an account selection and brought to the page that contains the selected account details. (3) Stock trading accounts provided by online stock brokerage firms: users typically are asked to login with User ID and Password on the starting page. Then the users are brought to the Welcome Page and then to the Stock Trade page, where the users are asked to fill out an online form that describes his desired transaction. The users are then brought to the confirmation page and asked to confirm the transaction.

These browsing procedures are often troublesome. Therefore, there is a need for retrieving target documents by automatic generation of navigation command sequences. There is also a need to automatically regenerate the sequence of online document navigation commands that lead from a starting document that has static address to a desired target document that is dynamically generated and has dynamically generated addresses.

Another need exists for generating navigation command sequences in an unattended mode and in a non-GUI environment. For instance, a user may use a wireless device such as a cell phone to instruct a server to run a bank account extraction or stock trade script (sequence of commands) for him. There is another need to eliminate the need to re-enter verification information, such as User IDs and Passwords, every time a user wishes to retrieve a target document. There is also a need to automate the navigation steps and validation information entries.

SUMMARY OF THE INVENTION

These and other needs are addressed by the present invention. The present invention relates to recording of command sequences and retrieval of a document linking to a starting document that has a static address on a data network. A sequence of commands that cause a browser in a computer system to navigate from a starting document to a target document on a data network is recorded using structured document trees. The recorded sequence of commands causes the browser to navigate from the starting document though a sequence of intermediate documents to the refreshed version of a target document. The invention allows recording and regenerating of the navigation command sequences even when the online documents are dynamically generated by a server computer and thus have dynamic online addresses that change every time the documents are regenerated.

A system according to the present invention records control elements, such as hyperlinks or form submission buttons, clicked by a user in a logical tree of a document on which the hyperlink or the button are embedded. Although addresses of intermediate and target web pages may change, the linkage structure remains the same. By recording the document tree structure and regenerating the hyperlink or button that is located in the same document tree, the same target page will be retrieved.

Therefore, a system according to the present invention records and later regenerates a sequence of navigation commands that leads the browser from the page that has a static address to the target page.

A method for automatic retrieval of a target document that links to a starting document having a static address, comprising the steps of: (a) recording at least one control element selected by a user to link from the starting document to the target document; (b) identifying a logical tree for each control element; (c) recording the logical tree identified in step (b); and (d) generating commands represented by the at least one control element to link from the starting document to the target document; wherein one of the control elements represents a dynamic address of the target document. In one aspect, step (a) further comprises recording input data submitted by the user. In another aspect, step (d) further comprises submitting the input data that was submitted by the user.

A method for creating a script for automatic retrieval of a target document that links to a starting document having a static address, comprising the steps of: (a) recording at a control element selected by a user during linking from the starting document to the target document; (b) identifying a logical tree for the control element; (c) recording the logical tree identified in step (b); (d) determining whether the target document is retrieved; and (e) repeating steps (a) to (d) in response to the target document not having been retrieved. In one aspect, step (a) further comprises recording input data submitted by the user. In another aspect, the steps of creating the script end in response to a control signal indicating that the target document has been retrieved.

A machine-readable medium bearing instructions for automatic retrieval of a target document that links to a starting document having a static address, the instructions being arranged to cause a data processing system upon execution thereby to perform the steps of: (a) recording at least one control element selected by a user to link from the starting document to the target document; (b) identifying a logical tree for each control element; (c) recording the logical tree identified in step (b); and (d) generating commands represented by the at least one control element to link from the starting document to the target document; wherein one of the control elements represents a dynamic address of the target document.

A data processing system for automatic retrieval of a target document that links to a starting document having a static address, comprising: a processor for processing data; a memory; a data storage device for storing data; an input device for inputting data; a communication interface configured for coupling to the data transmission network; a bus coupling to the input device, the memory, the data storage device, the communication interface, and the processor; the data storage device bearing instructions to cause the data processing system upon execution of the instructions by the processor to perform the steps of: (a) recording at least one control element selected by a user to link from the starting document to the target document in the data storage device; (b) identifying a logical tree for each control element; (c) recording the logical tree identified in step (b) in the data storage device; (d) generating commands represented by the at least one control element to link from the starting document to the target document; and (e) submitting control signals via the communication interface based on the commands generated in step (d); wherein one of the control elements represents a dynamic address of the target document.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 shows a partial document tree for the document shown in FIG. 3.

DETAILED DESCRIPTION OF THE INVENTION

An exemplary system for automatic retrieval of structured online documents is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
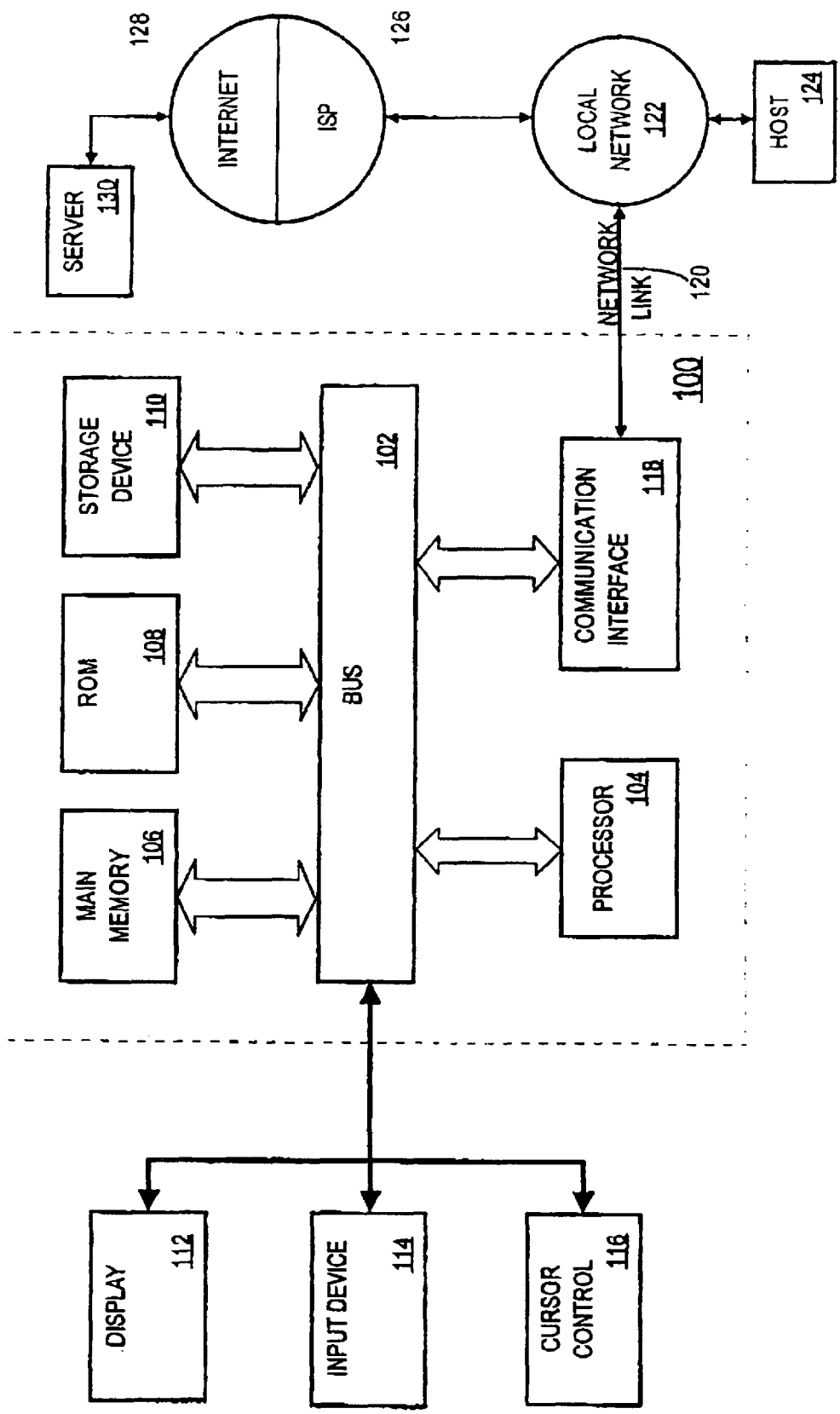
FIG. 1 depicts a computer system upon which an embodiment of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for automatic retrieval of structured online documents. According to one embodiment of the invention, access of a remote server or computer and communication therebetween is provided by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of machine-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution.

The computer systems as discussed above may communicate with other systems by using a lower level protocol called TCP/IP (Transmission Control Protocol/Internet Protocol). TCP/IP allows communication between interconnected networks or computers having diverse hardware architectures and various operating systems. On an application level, the computer systems may use Hypertext Transmission Protocol (HTTP) to conduct data transfer between systems on the World Wide Web (WWW). A server is a data processing system equipped with software capable of handling HTTP requests, such as a request from a Web browser. Structured online documents, such as HTML and XML documents, are widely available on the World Wide Web.

After a computer is connected to a data network, such as the internet, users typically use a web browser, such as Microsoft Internet Explorer, to retrieve documents contained in remote servers connected to the data network. Certain online documents, such as an account summary page, may have dynamic addresses embedded in hyperlinks or buttons linking to the target documents. This is to prevent unauthorized retrieval of documents by reproducing the links and to support a notion of relatively short-lived session created for the user when he logs in to the secure web site.

However, aside from the changes in content and hyperlink addresses, the structure of online documents remains substantially the same because they are generated by server computers automatically. Server computers use a fixed page template and attach the numbers to this template from a database. Session IDs are added to the link addresses from the online session management system.

A system according to the present invention fully automates the regeneration of a command sequence that a user uses a browser to retrieve a target document starting from a starting document. The system identifies the structure of the online documents and control elements, and records the sequence of command the user uses during navigation of the documents. For example, the logical relationship of control elements, such as hyperlinks, buttons, or other clickable elements, contained in a document is identified. The control elements that were clicked by the user are identified and recorded. During regeneration of the command sequence, the system simply identifies the control elements that have the same logical relationship in the new online document, and clicks the identified control elements, or regenerates the commands represented by the control elements, to cause reproduction of the process of navigation.

When recording a navigation sequence, the relative position of a control element in a hierarchy that represents the page on which the control element was clicked is recorded. When regenerating the navigation step on a newly downloaded document, the control element that has the same position in the structure of the new document as the position recorded for the original document is located.

Several techniques are used to record position of a control element in a hierarchy representing the online document:

1. Recording the path from the root element of the DOM tree to the node that represents the clicked control element.
2. Recording the index of form in which Submit method was invoked.
3. Recording the index of form in which control element was clicked and the position of the clicked element in a DOM tree that represents the form internals.

Logical Tree and DOM

Figure 2:
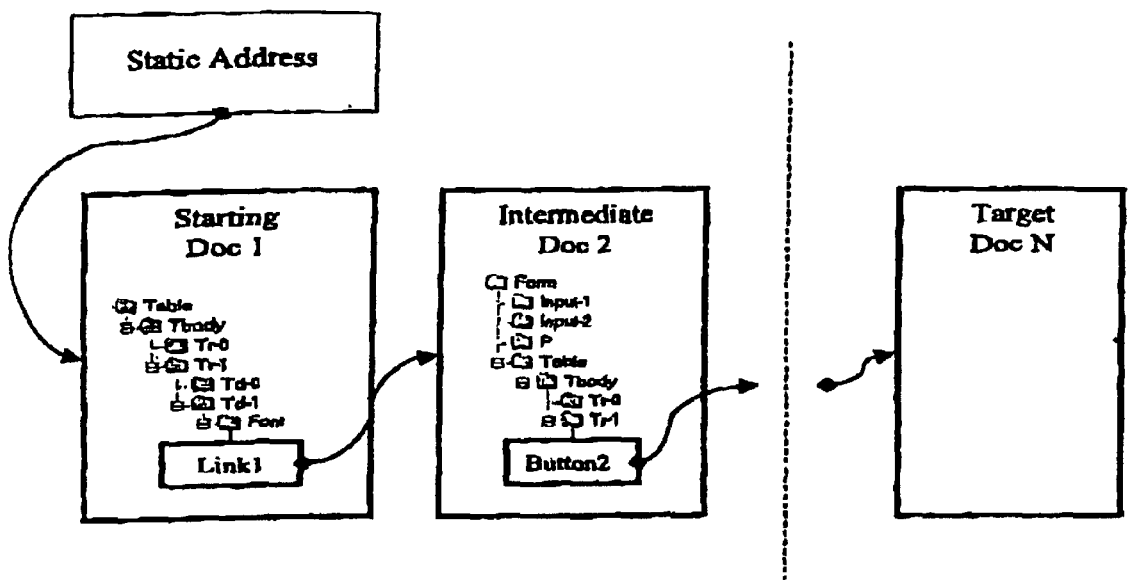
FIG. 2 shows a logical relationship of online documents and control elements.

A logical tree representation of online documents is used in creating a navigation script according to the present invention. In the document tree, each logical unit (or element) of the document (such as paragraph, table, heading) is represented by a node. Node A is a child on node B if and only if the document fragment represented by node A is directly embedded into document fragment represented by node B. See FIG. 2.

The most popular implementation of the online document tree model for HTML and XML online documents is the Document Object Model (DOM). Document Object Model can be used to navigate the content of an online document represented as a tree of nodes.

Document Object Model is implemented in browsers such as Microsoft Internet Explorer ver 4 or Netscape Navigator ver. 6. Other embodiments of this invention can use different tree models for representing online documents.

Figure 3:
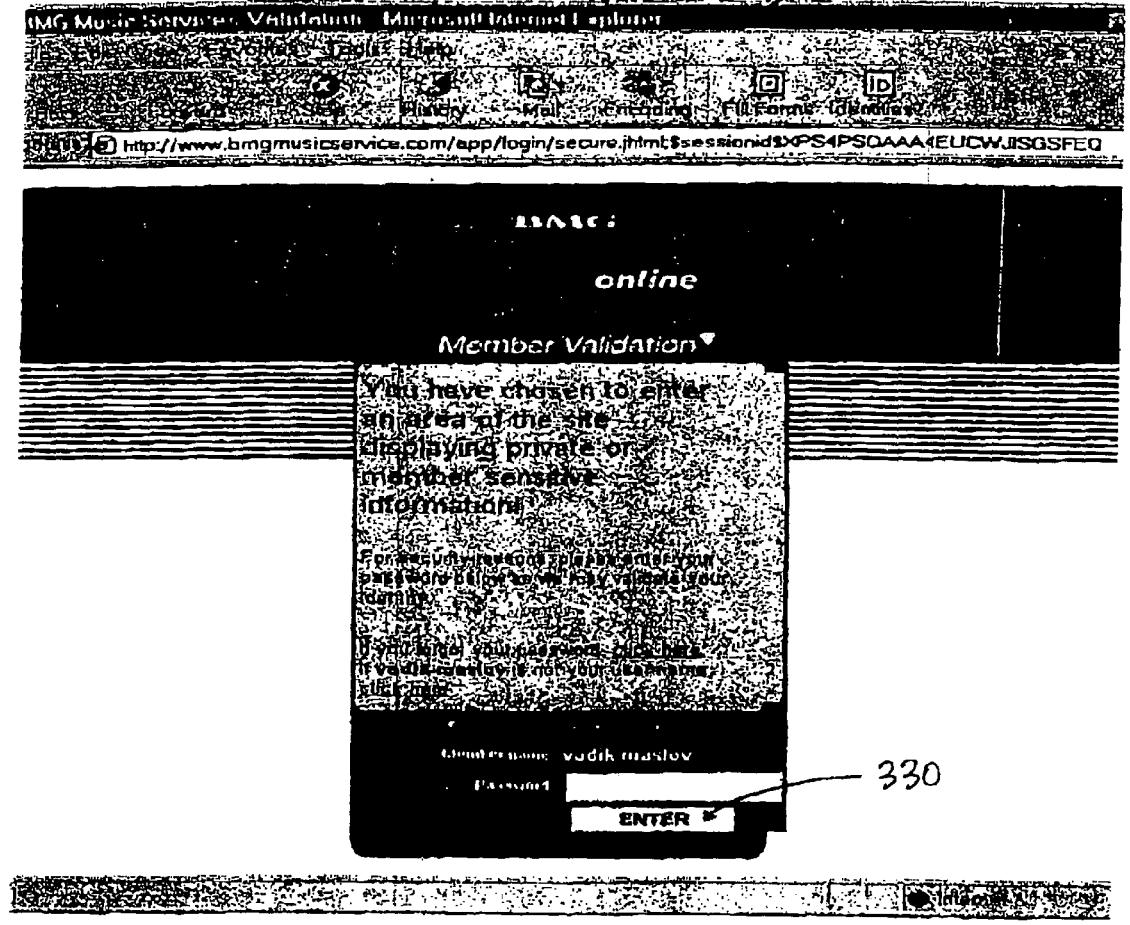
FIG. 3 shows an example of an intermediate online document that is dynamically generated and has a dynamically generated URL with Session ID in it.

FIG. 4 shows a partial DOM tree 410 of the online document (web page) 310 from FIG. 3 (complete tree is too big to show it in one page). The root of the tree is the node 420 with "HTML" tag, it represents the whole document. The node 430 with tag "INPUT" on FIG. 4 represents HTML element "INPUT" that corresponds to the "ENTER" button 330 on FIG. 3. This button when clicked causes navigation to the next page, typically the Welcome Page.

Creating the Script

A script that controls a computer system to navigate through a sequence of online documents is created in the following manner. A starting document, such as the front page of a web site or a log-in page, often has a static URL address. Therefore, a user can retrieve the starting argument by specifying the specific address and use the web browser to retrieve the corresponding document. After the starting document is retrieved, the Starting Document is displayed in the browser window. The user enters the recording phase by generating a "Record" command, such as keying a command or clicking on a "Record" button.

In the recording phase, the user simply clicks the control elements, such as buttons, hyperlinks, etc., on web pages and submits alpha-numeric form inputs as required when navigating from one page to another. Sequence and contents of navigation clicks and form submissions are recorded in a script in a manner specified below. When the user navigates to the desired Target Document, he invokes a command indicating the end of the recording.

When the user wishes to retrieve the target document for the second time, the user can send a command to the computer system requesting access to the target document. In response to the command, the computer system accesses the recorded script. Based on the contents and the sequence of the control elements and the inputs recorded in the transcript, the browser retrieves the Starting Page and regenerates all clicks and submits all inputs recorded by in the script. Thus, upon execution of the scripts, the computer system is controlled to retrieve the desired Target Document without human intervention.

The recorded navigation may include: (i) clicking hyperlinks, (ii) filling and submitting forms, (iii) entering basic authentication credentials, (iv) clicking the JavaScript-controlled document elements that cause navigation by command in client-side JavaScript.

Recording the Script Algorithm

An example of the recording algorithm is shown as follows. Please note that this invention is not limited by this specification of this algorithm. The algorithm merely illustrates one example of this application. Other similar algorithms may be used to implement this invention.

This algorithm is run every time when a user clicks a control element at the time of recording:

Input: tree node for clicked-element, is a part of the current web page document tree.

Output: the script fragment that regenerates the click of clicked-element.

1. Add "Click This" command to the script fragment.
2. Variable e refers in the current tree node. Set e to the clicked-element.
3. Do until e is not NULL
4. If e. tag is equal to "BODY" or e has no parent Then Exit this loop
5. Create "Go To Child Number ix" command object.
6. Tree node p=parent of e
7. Compute integer ix which is equal to index of node e in the node p. Index of the first child is 0, index of the second child is 1, and so on.
8. Store ix in the command.
9. Add command before the first command at the script.
10. EndDo Regenerating the Script The user can instruct the computer to run the created script or alternatively run a script loaded from a file. The system according to the present invention then executes the sequence of commands contained in the script and causes the browser to navigate from the Starting Page to the Target Page.

When script is regenerated, all commands are read sequentially from the script and executed one by one. This is the algorithm that finds the element to be clicked. It is applied to the new version of a page downloaded at the time of regenerate:

Input: fresh online document tree, and the script to be played.

Output: the node to be clicked on this page.

1. Set the pointer to tree node e to the root of the online document tree.
2. For every command in a script Do
3. If command is "Go to Nth Child" Then
4. e :=Nth child of node e
5. Else If command is "Click This" Then
6. Click the node e
7. EndIf
8. EndDo Every time an online document is loaded, there is no guarantee that the document will be the same as the previously loaded document or that it will even be close to the previously loaded document. Many things can change even in the relatively stable documents generated from online databases: (1) Advertising banners that appear on most web pages change every time the page is loaded, and they may have complicated internal structure that is different for every ad that is displayed; (2) Certain non-advertising items may substantially change too. For instance, account balances may change on the Account Summary page, but their position of the page would remain the same.

Therefore, in order to be able to find the user-clicked control element in the changed online document, we need to rely on a document model such that an algorithm of finding the user-selected fragment on a new version of the page will be the least affected by changes in the other parts of the document. The Document Tree is the document model that was selected for use in the present invention, because it provides good degree of independence of the navigation script from the document changes.

Tree nodes and their children that are not on the path from the root to the user-clicked node may change and their change will not affect the path to the user-clicked element, so the script that locates this element will still work.

Summary of Benefits

The present invention brings the following benefits to its user:

1. Users do not to have to manually click through a long sequence of online documents that leads him to the desired Target Document. Additionally, users do not have to re-enter required alpha/numeric inputs (e.g., User IDs and Passwords) in order to retrieve the desired Target Document. Users only need to record the retrieval process once and then the system can regenerate this sequence automatically.
2. Automatic document retrieval and command regeneration can occur in non-GUI server environment.
3. The ability of the user to regenerate navigation scripts in a non-GUI, unattended mode allows a user to execute multiple transactions without having to manually perform the navigation steps required for the multiple transactions.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for automatic retrieval of a target document that links to a starting document having a static address, comprising the steps of:
   (a) recording at least one control element selected by a user to link from the starting document to the target document;
   (b) identifying a logical tree for each control element;
   (c) recording the logical tree identified in step (b); and
   (d) generating commands represented by the at least one control element to link from the starting document to the target document;
   wherein one of the control elements represents a dynamic address of the target document.

2. The method of claim 1, wherein step (a) further comprises recording input data submitted by the user.

3. The method of claim 2, wherein step (d) further comprises submitting the input data.

4. A method for creating a script for automatic retrieval of a target document that links to a starting document having a static address, comprising the steps of:
   (a) recording a control element selected by a user during linking from the starting document to the target document;
   (b) identifying a logical tree for the control element;
   (c) recording the logical tree identified in step (b);
   (d) determining whether the target document is retrieved; and
   (e) repeating steps (a) to (d) in response to the target document not having been retrieved.

5. The method of claim 4, wherein step (a) further comprises recording input data submitted by the user.

6. The method of claim 4, wherein the steps of creating the script end in response to a control signal indicating the target document has been retrieved.

7. A machine-readable medium bearing instructions for automatic retrieval of a target document that links to a starting document having a static address, the instructions being arranged to cause a data processing system upon execution thereby to perform the steps of:

(a) recording at least one control element selected by a user to link from the starting document to the target document;

(b) identifying a logical tree for each control element;

(c) recording the logical tree identified in step (b); and (d) generating commands represented by the at least one control element to link from the starting document to the target document;

wherein one of the control elements represents a dynamic address of the target document.

8. The medium of claim 7, wherein step (a) further comprises recording input data submitted by the user.

9. The medium of claim 8, wherein step (d) further comprises submitting the input data.

10. A data processing system for automatic retrieval of a target document that links to a starting document having a static address, comprising:

a processor for processing data;

a memory;

a data storage device for storing data;

an input device for inputting data;

a communication interface configured for coupling to the data transmission network;

a bus coupling to the input device, the memory, the data storage device, the communication interface, and the processor;

the data storage device bearing instructions to cause the data processing system upon execution of the instructions by the processor to perform the steps of:

(a) recording at least one control element selected by a user to link from the starting document to the target document in the data storage device;

(b) identifying a logical tree for each control element;

(c) recording the logical tree identified in step (b) in the data storage device;

(d) generating commands represented by the at least one control element to link from the starting document to the target document; and (e) submitting control signals via the communication interface based on the commands generated in step (d);

wherein one of the control elements represents a dynamic address of the target document.

11. The system of claim 10, wherein step (a) further comprises recording input data submitted by the user in the data storage device.

12. The system of claim 11, wherein step (d) further comprises submitting the input data via the communication interface.

* * * * *